United States Patent
Taguchi et al.

(10) Patent No.: US 10,326,150 B2
(45) Date of Patent: Jun. 18, 2019

(54) FUEL CELL MODULE, FUEL CELL STACK, AND METHOD FOR PRODUCING FUEL CELL MODULE

(71) Applicant: Panasonic Intellectual Property Management Co., Ltd., Osaka (JP)

(72) Inventors: Yoshifumi Taguchi, Osaka (JP); Norihisa Yoshimoto, Osaka (JP); Tsutomu Kawashima, Nara (JP); Mitsuo Yoshimura, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/503,387

(22) PCT Filed: Aug. 25, 2015

(86) PCT No.: PCT/JP2015/004242
§ 371 (c)(1),
(2) Date: Feb. 10, 2017

(87) PCT Pub. No.: WO2016/031226
PCT Pub. Date: Mar. 3, 2016

(65) Prior Publication Data
US 2017/0229718 A1 Aug. 10, 2017

(30) Foreign Application Priority Data
Aug. 26, 2014 (JP) .................. 2014-171736

(51) Int. Cl.
*H01M 8/0284* (2016.01)
*H01M 8/242* (2016.01)
(Continued)

(52) U.S. Cl.
CPC ......... *H01M 8/0284* (2013.01); *H01M 4/881* (2013.01); *H01M 8/0234* (2013.01);
(Continued)

(58) Field of Classification Search
CPC ............. H01M 8/0284; H01M 8/1007; H01M 8/0263; H01M 8/2484; H01M 8/0286;
(Continued)

(56) References Cited

U.S. PATENT DOCUMENTS 4,233,371 A 11/1980 Dorrestijn
2002/0094470 A1 7/2002 Wilkinson et al.
(Continued)

FOREIGN PATENT DOCUMENTS

JP 2001-522522 11/2001
JP 2002-156044 A 5/2002
(Continued)

OTHER PUBLICATIONS

International Search Report of PCT application No. PCT/JP2015/004242 dated Nov. 24, 2015.
(Continued)

*Primary Examiner* — Philip A. Stuckey
(74) *Attorney, Agent, or Firm* — Panasonic IP Management; Kerry S. Culpepper

(57) ABSTRACT

A fuel cell module includes an electrode membrane assembly and a pair of separators. The electrode membrane assembly includes an electrode portion and a pair of gas diffusion layers. The electrode portion includes a polymer electrolyte membrane, an anode electrode formed on a first surface of the polymer electrolyte membrane, and a cathode electrode formed on a second surface of the polymer electrolyte membrane. One of the pair of gas diffusion layers is in contact with an anode surface of the electrode portion at which the anode electrode is disposed, and the other is in contact with a cathode surface of the electrode portion at which the cathode electrode is disposed. The separators sandwich the electrode membrane assembly from respective the anode surface and the cathode surface. The electrode
(Continued)

membrane assembly and each separator are adhered to each other by a plurality of resin portions.

4 Claims, 19 Drawing Sheets

(51) Int. Cl.
| | |
|---|---|
| *H01M 4/88* | (2006.01) |
| *H01M 8/0234* | (2016.01) |
| *H01M 8/0239* | (2016.01) |
| *H01M 8/0243* | (2016.01) |
| *H01M 8/0273* | (2016.01) |
| *H01M 8/2457* | (2016.01) |
| *H01M 8/2484* | (2016.01) |
| *H01M 8/1007* | (2016.01) |
| *H01M 8/0263* | (2016.01) |
| *H01M 8/0286* | (2016.01) |
| *H01M 8/1004* | (2016.01) |
| *H01M 8/1018* | (2016.01) |

(52) U.S. Cl.
CPC ....... *H01M 8/0239* (2013.01); *H01M 8/0243* (2013.01); *H01M 8/0263* (2013.01); *H01M 8/0273* (2013.01); *H01M 8/0286* (2013.01); *H01M 8/1004* (2013.01); *H01M 8/1007* (2016.02); *H01M 8/242* (2013.01); *H01M 8/2457* (2016.02); *H01M 8/2484* (2016.02); H01M 2008/1095 (2013.01); H01M 2300/0082 (2013.01); Y02P 70/56 (2015.11)

(58) Field of Classification Search
CPC .. H01M 8/1004; H01M 8/2457; H01M 4/881; H01M 8/0273; H01M 8/0243; H01M 8/0239; H01M 8/0234; H01M 8/242; H01M 2300/0082; H01M 2008/1095; Y02P 70/56
See application file for complete search history.

(56) References Cited

U.S. PATENT DOCUMENTS

| | | | |
|---|---|---|---|
| 2002/0106954 A1* | 8/2002 | Sakumoto | F16J 15/104 442/104 |
| 2002/0164518 A1 | 11/2002 | Wilkinson et al. | |
| 2005/0255372 A1 | 11/2005 | Lertola | |
| 2007/0184327 A1* | 8/2007 | Ishioka | H01M 8/0273 429/457 |
| 2008/0220312 A1 | 9/2008 | Kato | |
| 2008/0305384 A1 | 12/2008 | Kawashima et al. | |
| 2009/0253014 A1 | 10/2009 | Tanahashi et al. | |
| 2011/0045380 A1* | 2/2011 | Suzuki | H01M 8/0273 429/480 |
| 2011/0244358 A1 | 10/2011 | Yamauchi et al. | |
| 2014/0120452 A1* | 5/2014 | Yamauchi | H01M 8/0284 429/480 |
| 2015/0295266 A1 | 10/2015 | Nonoyama | |

FOREIGN PATENT DOCUMENTS

| | | |
|---|---|---|
| JP | 2005-166425 | 6/2005 |
| JP | 2005-183210 A | 7/2005 |
| JP | 2006-244765 | 9/2006 |
| JP | 2006-286592 | 10/2006 |
| JP | 2009-021217 | 1/2009 |
| JP | 2012-164563 | 8/2012 |
| JP | 2014-093168 | 5/2014 |

OTHER PUBLICATIONS

The Extended European Search Report dated Jun. 14, 2017 for the related European Patent Application No. 15835902.6.

* cited by examiner

FUEL CELL MODULE, FUEL CELL STACK, AND METHOD FOR PRODUCING FUEL CELL MODULE

CROSS-REFERENCE TO RELATED APPLICATIONS

This application is a U.S. national stage application of the PCT International Application No. PCT/JP2015/004242 filed on Aug. 25, 2015, which claims the benefit of foreign priority of Japanese patent application No. 2014-171736 filed on Aug. 26, 2014, the contents all of which are incorporated herein by reference.

TECHNICAL FIELD

The present invention relates to a polymer electrolyte fuel cell (PEFC), and more particularly to the structure of a fuel cell module formed of an electrode membrane assembly and a separator.

BACKGROUND

A fuel cell generates electricity and heat simultaneously by making a fuel gas which contains hydrogen and an oxidizing agent gas such as air which contains oxygen electrochemically react with each other. A PEFC includes: a polymer electrolyte membrane which selectively transports hydrogen ions; and an anode electrode and a cathode electrode formed on both surfaces of the polymer electrolyte membrane. These electrodes respectively include a catalyst layer formed on a surface of the polymer electrolyte membrane, and a gas diffusion layer (GDL) which is disposed outside the catalyst layer and has both air permeability and electronic conductivity. A structural body where the polymer electrolyte membrane and the electrodes are integrally assembled to each other by joining is referred to as a membrane electrode assembly (MEA).

A pair of conductive separators is arranged on both sides of the MEA. The pair of conductive separators fixes the MEA by mechanically sandwiching the MEA therebetween, and electrically connecting adjacent MEAs to each other in series. In contact portions of the separators with the MEA, a gas flow passage for supplying a reaction gas to the respective electrodes and for carrying away generated water and a surplus gas is formed. Further, to prevent a reaction gas supplied to the gas flow passage from leaking to the outside or being mixed with a gas outside the gas flow passage, a sealing member (seal) is disposed between the pair of separators such that the sealing member surrounds outer peripheries of electrode forming portions in the MEA. Such a structural body is referred to as a battery module (cell).

In a fuel cell, the enhancement of utilization efficiency of a gas is one of the important issues. As a cause of lowering of the utilization efficiency, a cross leakage of a gas, an external leakage of a gas or a shortcut of a gas is named.

From a reason such as manufacturing constraints, there may be a case where a gap is formed between an inner edge of a gasket and an outer edge of an electrode forming portion. When such a gap exists on an anode surface side, on a cathode surface side or on both the anode surface side and the cathode surface side, there is a possibility that a fuel gas and an oxidizing agent gas leak through the gap during an operation of the PEFC. The leaked fuel gas and oxidizing agent gas are discharged to the outside with being hardly exposed to the MEA. As a result, the utilization efficiency of the fuel gas and the oxidizing agent gas is lowered, which lowers efficiency (electricity generating efficiency) of the PEFC. A shortcut of a gas occurs due to such a cause.

To overcome such problems, there has been known a structure where a MEA integrated product is formed by combining a MEA, a frame body which holds the MEA and a gasket material having resiliency into an integral body (for example, see Unexamined Japanese Patent Publication No. 2009-21217).

On the other hand, a fuel cell stack has been required to satisfy downsizing and the reduction of thickness. However, a so-called carbon separator which uses carbon and a resin bonding material as base materials exhibits a large linear expansion coefficient, and hence, the carbon separator exhibits a large change in size during an operation. Accordingly, the fuel cell stack requires a spring or the like for absorbing such a change in size, and thus the fuel cell stack cannot be downsized. Further, to allow the fuel cell stack to acquire the strength, it is necessary to increase the thickness of the separator. On the other hand, there has been known a structure which enables a fuel cell stack to achieve both the reduction of a linear expansion coefficient and the reduction of thickness by using a separator where a flow passage is formed on conductive prepreg by press working (for example, see Unexamined Japanese Patent Publication No. 2006-28659).

Further, when a fuel cell is prepared by stacking a plurality of unit cells each formed by sandwiching a power generating element between a pair of separators prepared by compression molding, separators of the unit cells disposed adjacently to each other are adhered to each other with an adhesive agent. There has been known a structure where the adhesive agent functions as a seal member for sealing cooling water which flows in the separators (for example, see Unexamined Japanese Patent Publication No. 2005-166425).

SUMMARY

The present invention provides a fuel cell module, a fuel cell stack and a method for producing a fuel cell module which can prevent a cross leakage, an external leakage and a shortcut of a gas with a simple structure and a simple producing method and, at the same time, can realize the downsizing and the reduction of thickness of the fuel cell module or the fuel cell stack while improving the durability.

A fuel cell module according to an aspect of the present invention includes an electrode membrane assembly and a pair of separators. The electrode membrane assembly includes an electrode portion and a pair of gas diffusion layers. The electrode portion includes a polymer electrolyte membrane, an anode electrode formed on a first surface of the polymer electrolyte membrane, and a cathode electrode formed on a second surface of the polymer electrolyte membrane. One of the pair of gas diffusion layers is in contact with an anode surface of the electrode portion at which the anode electrode is disposed, and the other of the pair of gas diffusion layers is in contact with a cathode surface of the electrode portion at which the cathode electrode is disposed. The separators sandwich the electrode membrane assembly from respective the anode surface and the cathode surface. The electrode membrane assembly and the respective separators are adhered to each other by a plurality of resin portions made of a resin which at least partially contains fibers. At least a part of each of the pair of gas diffusion layers is impregnated with the resin.

With such a configuration, it is possible to prevent a cross leakage, an external leakage and a shortcut of a gas with a simple structure and, at the same time, it is also possible to realize the downsizing and the reduction of thickness.

In this case, a fuel cell stack is formed by stacking the fuel cell modules. The respective fuel cell modules are integrally joined to each other by being fastened to each other with a gasket sandwiched therebetween or by being adhered to each other by a resin portion.

Further, according to another aspect of the present invention, there is provided a method for producing a fuel cell module where a plurality of resin sheets in a solid state each of which at least partially contains fibers are formed into an annular shape and are made to overlap with respective both surfaces of the electrode membrane assembly. Then, the electrode membrane assembly formed by overlapping the plurality of resin sheets is sandwiched by the pair of separators and is heated. With such an operation, the electrode membrane assembly and the separator are integrally joined to each other by adhesion.

Thus, the above-mentioned fuel cell module can be prepared.

As has been described above, according to the present invention, with respect to both a fuel gas and an oxidizing agent gas, it is possible to prevent a cross leakage, an external leakage and a shortcut and hence, lowering of electricity generation efficiency can be suppressed. Further, it is possible to achieve the downsizing and the reduction of thickness by decreasing a linear expansion coefficient of the module.

DESCRIPTION OF EMBODIMENT

Prior to the description of an exemplary embodiment of the present invention, problems of conventional fuel cell modules are briefly described.

In the configuration described in Unexamined Japanese Patent Publication No. 2009-21217, it is necessary to fill a gap disposed between the frame body and a polymer electrolyte membrane with a seal which is an elastic body and hence, high dimensional accuracy of parts and high assembling accuracy are required. Accordingly, it is necessary to provide a seal having a complicated shape which can prevent the occurrence of a gap within a tolerance range and, at the same time, the thickness of the seal cannot be made small for enabling setting of the tolerance.

In the configuration described in Unexamined Japanese Patent Publication No. 2006-28659, a linear expansion coefficient and a thickness of the separator are lowered. However, no description is made with respect to a seal in Unexamined Japanese Patent Publication No. 2006-28659. Even in the case where a seal formed of an elastic body is used in Unexamined Japanese Patent Publication No. 2006-28652, there arises a problem substantially the same as the problem of above-described Unexamined Japanese Patent Publication No. 2009-21217. Further, when an adhesive agent or the like is used as the seal, a linear expansion coefficient of the seal becomes larger than that of the separator, and accordingly, the reliability of the seal at the time of the operation is lowered. Further, a liquid having high viscosity is used as the adhesive agent and hence, producing processes become complicated.

In the configuration described in Unexamined Japanese Patent Publication No. 2005-166425, the separators are fixed to each other using the adhesive agent. However, a linear expansion coefficient of the adhesive agent is generally larger than that of the separator. Accordingly, a stress is generated in a stacking direction and in an in-plane direction due to a change in temperature which is generated at the time of starting or stopping a fuel cell and hence, the durability of the fuel cell is lowered. Further, when a layer of the adhesive agent is used as an insulating layer of an electrode surface, a resin flows at the time of curing the resin and hence, it is difficult for the resin to maintain a fixed thickness. As a result, electrical insulation cannot be ensured. It is also difficult to partially change fluidity of the resin. Accordingly, even when the adhesive agent has the composition and the configuration which can lower the fluidity, there is a possibility that a gap is formed between the electrode and the adhesive agent, which causes a shortcut through which a gas flows.

Hereinafter, an exemplary embodiment of the present invention is described with reference to the drawings.

Figure 1:
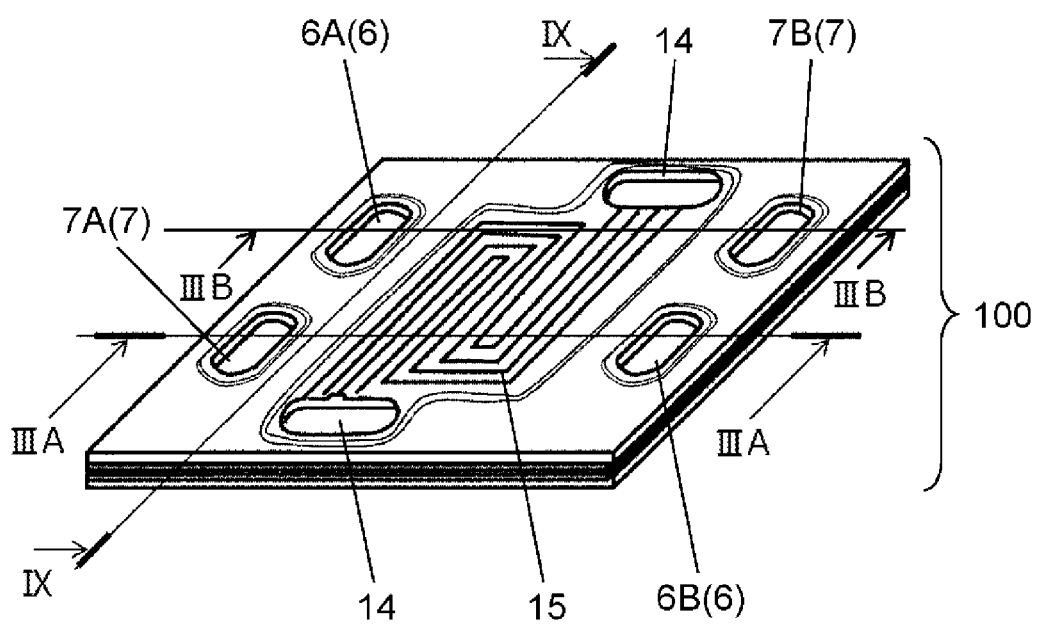
FIG. 1 is a schematic view of a fuel cell module according to an exemplary embodiment of the present invention.
Figure 2:
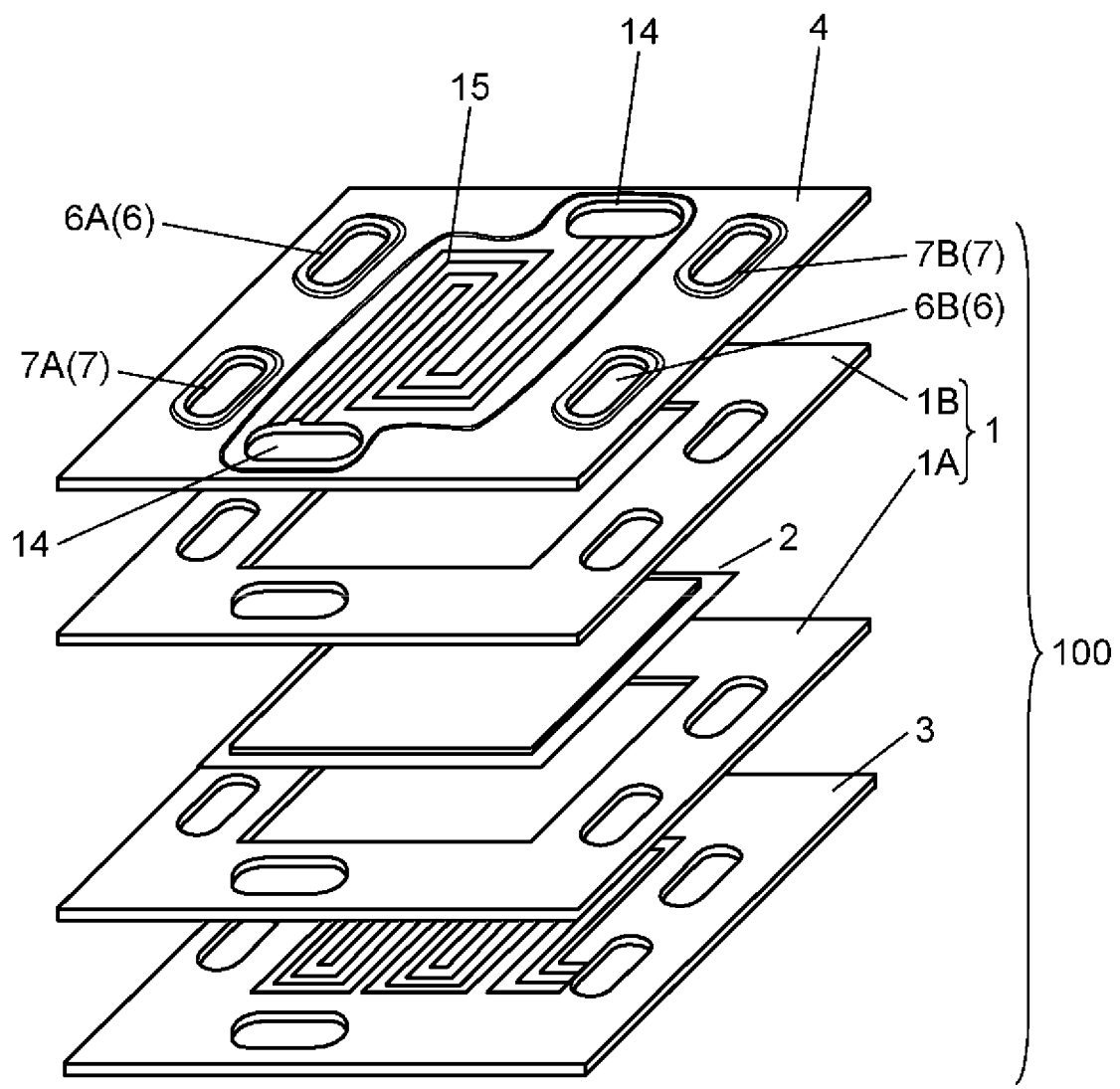
FIG. 2 is an exploded view of the fuel cell module shown in FIG. 1.
Figure 3A:
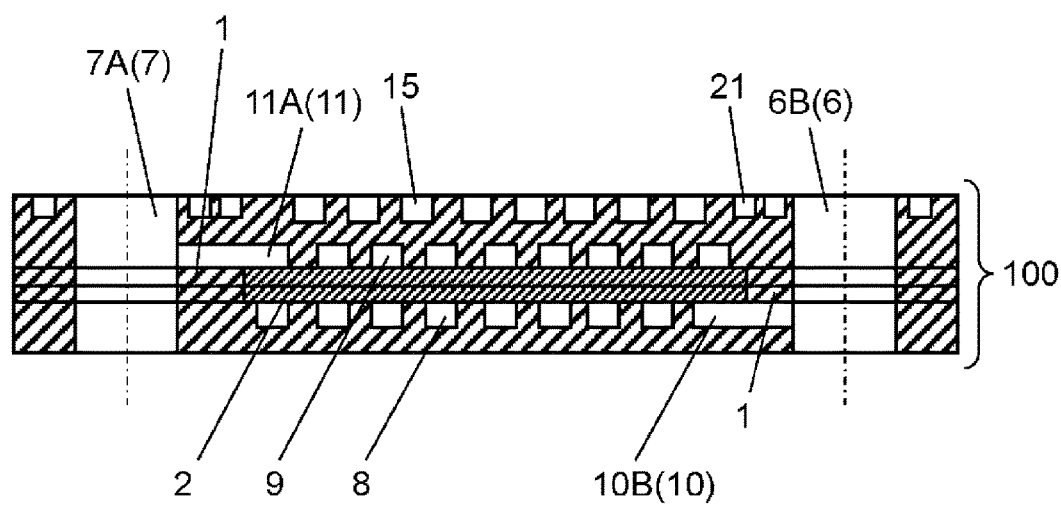
FIG. 3A is a cross-sectional view of the fuel cell module shown in FIG. 1.
Figure 3B:
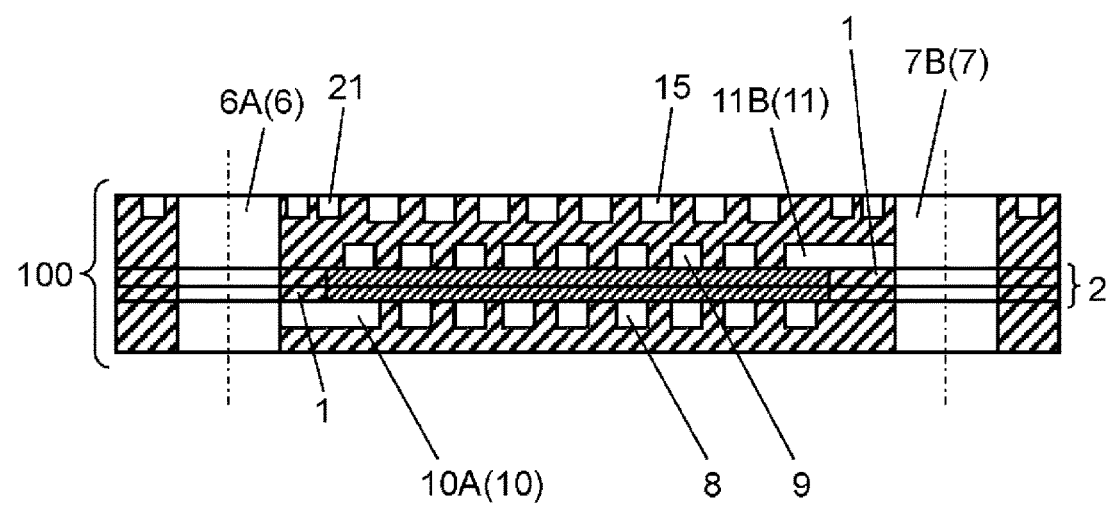
FIG. 3B is another cross-sectional view of the fuel cell module shown in FIG. 1.
Figure 4:
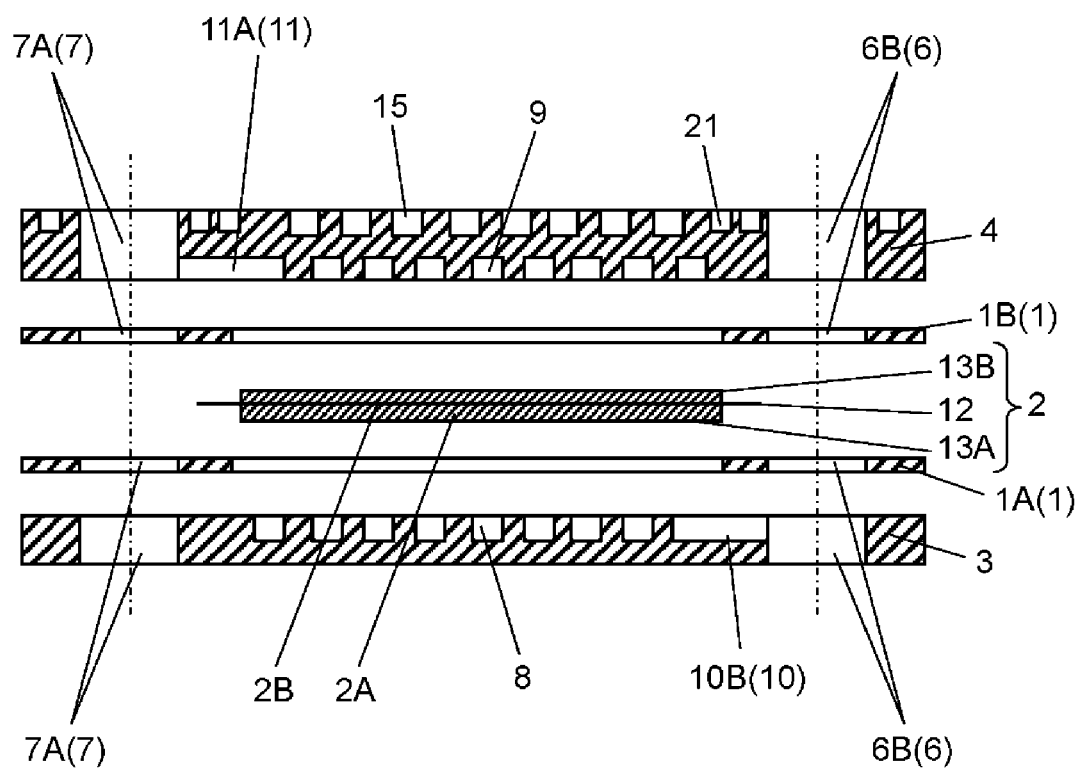
FIG. 4 is an exploded view of the fuel cell module shown in FIG. 3A.
Figure 5:
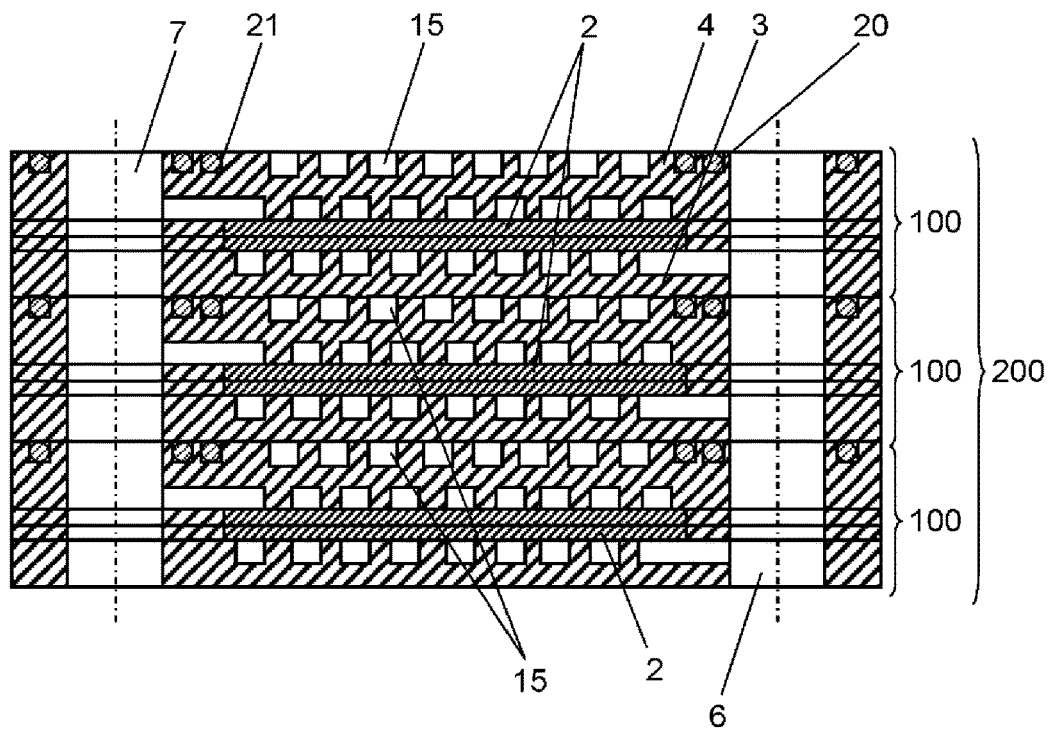
FIG. 5 is a cross-sectional view of a fuel cell module stacked body which uses the fuel cell modules shown in FIG. 3A.
Figure 6:
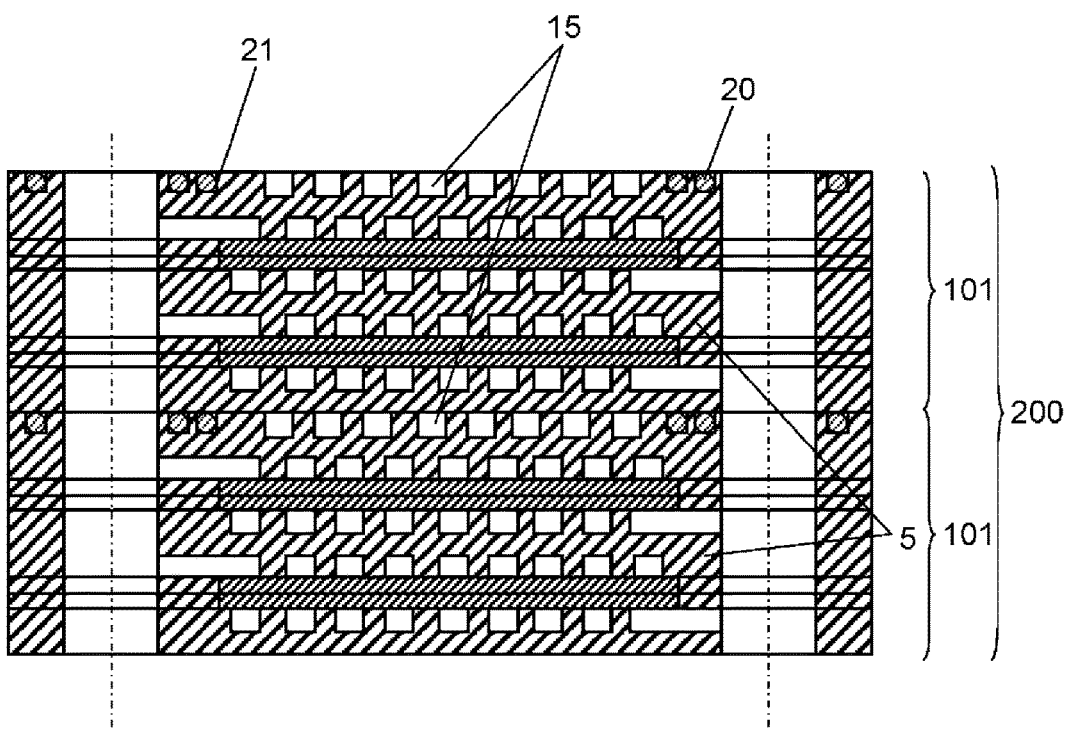
FIG. 6 is a cross-sectional view of a fuel cell module stacked body which uses other fuel cell modules according to the exemplary embodiment of the present invention.
Figure 7:
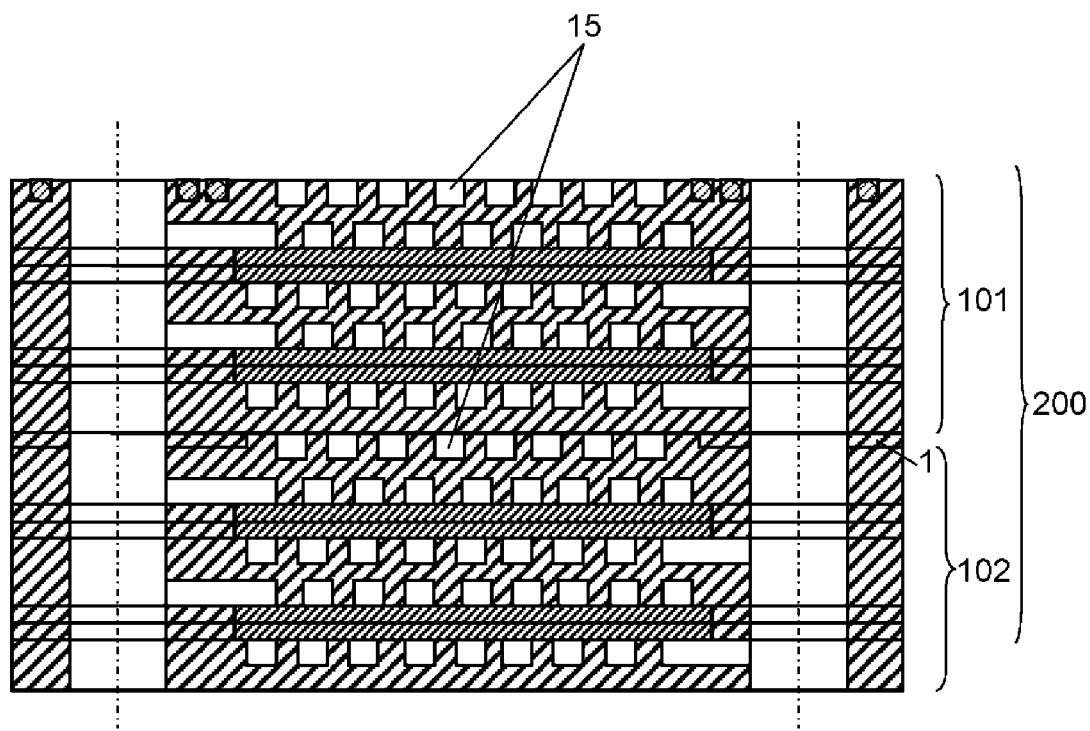
FIG. 7 is a cross-sectional view showing another example of a fuel cell module stacked body which uses the fuel cell modules shown in FIG. 3A.

FIG. 1 is a perspective view schematically showing a structure of a fuel cell module according to the exemplary embodiment of the present invention. FIG. 2 is an exploded view of the fuel cell module shown in FIG. 1. FIG. 3A is a cross-sectional view taken along a line IIIA-IIIA in FIG. 1, and FIG. 4 is an exploded view of the fuel cell module shown in FIG. 3A. FIG. 3B is a cross-sectional view taken along a line IIIB-IIIB in FIG. 1. FIGS. 5 to 7 are cross-sectional views showing examples of a fuel cell module stacked body.

As shown in FIGS. 1 and 2, fuel cell module 100 includes: electrode membrane assembly (hereinafter referred to as MEA) 2; anode separator 3; and cathode separator 4 (hereinafter referred to as separators 3, 4). MEA 2 is sandwiched by separators 3, 4. Separators 3, 4 are a pair of conductive separators. Separator 3 forms a fuel gas passage therein, and separator 4 forms an oxidizing agent gas passage therein.

To be more specific, as shown in FIGS. 3A and 4, MEA 2 includes: polymer electrolyte membrane 12; anode electrode 2A formed on a first surface of polymer electrolyte membrane 12; cathode electrode 2B formed on a second surface of polymer electrolyte membrane 12; and a pair of gas diffusion layers 13A, 13B. Polymer electrolyte membrane 12, anode electrode 2A and cathode electrode 2B form an electrode portion. Gas diffusion layer 13A is in contact with an anode surface of the electrode portion at which anode electrode 2A is disposed, and gas diffusion layer 13B is in contact with a cathode surface of the electrode portion at which cathode electrode 2B is disposed. Separators 3, 4 sandwich MEA 2 from respective the anode surface and the cathode surface.

Gas diffusion layers 13A, 13B are in contact with surfaces of separators 3, 4 respectively. The fuel gas flow passage is defined by fuel gas flow passage grooves 8 formed on separator 3 and gas diffusion layer 13A. The oxidizing agent gas flow passage is defined by oxidizing agent gas flow passage groove 9 formed on separator 4 and gas diffusion layer 13B. With such a configuration, a fuel gas is brought into contact with gas diffusion layer 13A which faces separator 3, and an oxidizing agent gas is brought into contact with gas diffusion layer 13B which faces separator 4, so that the fuel gas and the oxidizing agent gas cause an electrochemical reaction.

Separators 3, 4 and MEA 2 are integrally joined to each other such that each of separators 3, 4 and a peripheral edge of MEA 2 are adhered to each other by a resin portion 1 which at least partially contains fibers. Resin portion 1 includes resin portion 1A which is in contact with separator 3 and resin portion 1B which is in contact with separator 4. Gas diffusion layer 13A is at least partially impregnated with resin portion 1A, and gas diffusion layer 13B is at least partially impregnated with resin portion 1B.

As shown in FIG. 1, fuel gas manifolds 6 and oxidizing agent gas manifolds 7 both of which are respectively a pair of through holes are formed in a peripheral edge portion of module 100. That is, fuel gas manifolds 6 are constituted of fuel gas manifolds 6A, 6B, and oxidizing agent gas manifolds 7 are constituted of oxidizing agent gas manifolds 7A, 7B. A fuel gas flows through fuel gas manifolds 6, and an oxidizing agent gas flows through oxidizing agent gas manifolds 7. As shown in FIGS. 3A to 4, fuel gas manifolds 6 and oxidizing agent gas manifolds 7 are formed in each of peripheral edge portions of separators 3, 4 and MEA 2.

To introduce and discharge respective gases to and from electrode surfaces of MEA 2 through fuel gas manifolds 6 and oxidizing agent gas manifolds 7, connecting grooves 10, 11 are formed on separators 3, 4 respectively. A fuel gas connecting passage is defined by connecting grooves 10, MEA 2 and resin portion 1, and an oxidizing agent gas connecting passage is defined by connecting grooves 11, MEA 2 and resin portion 1.

Connecting groove 10 includes connecting grooves 10A, 10B, and connecting groove 11 includes connecting grooves 11A, 11B. Connecting groove 10A is connected to a supply end of fuel gas flow passage groove 8, and connecting groove 10B is connected to a discharge end of fuel gas flow passage groove 8. Connecting groove 11A is connected to a supply end of oxidizing agent gas flow passage groove 9, and connecting groove 11B is connected to a discharge end of oxidizing agent gas flow passage groove 9.

Fuel gas manifold 6A is connected to fuel gas flow passage groove 8 through connecting groove 10A, and fuel gas manifold 6B is connected to fuel gas flow passage groove 8 through connecting groove 10B. Oxidizing agent gas manifold 7A is connected to oxidizing agent gas flow passage groove 9 through connecting groove 11A, and oxidizing agent gas manifold 7B is connected to oxidizing agent gas flow passage groove 9 through connecting groove 11B.

As shown in FIG. 1, a pair of cooling water manifolds 14 is further formed in module 100, and cooling water flow passage groove 15, which is connected to cooling water manifolds 14, is formed on separator 4. Cooling water flow passage groove 15 is formed on a surface of separator 4 on a side opposite to a surface of separator 4 on which oxidizing agent gas flow passage groove 9 is formed. Fuel gas manifolds 6, oxidizing agent gas manifolds 7 and cooling water manifolds 14 are disposed at four sides of the outer periphery of the electrode surface. However, shapes and positions of these manifolds, connecting flow passages and flow passages formed in the electrode surfaces are not limited to the above-mentioned shapes and positions, and these manifolds and passages may be freely disposed depending on a design.

It is preferable from a viewpoint of a heat-resistant temperature, a linear expansion coefficient and the like that resin portion 1 is made of a prepreg where glass fibers are impregnated with an epoxy resin. Besides FR-4, materials having various physical properties may be selected for resin portion 1. However, fibers and a resin for resin portion 1 are not limited to the above-mentioned fibers and resin. Other fibers such as aramid fibers or carbon fibers may be used as fibers for resin portion 1 depending on a desired strength, a thickness, a linear expansion coefficient and a contained material. The resin for resin portion 1 may be another thermosetting resin such as a phenol resin, an unsaturated polyester resin or a polyurethane resin, or may be a thermoplastic resin. Resin portion 1 may be formed by stacking a resin which contains fibers and another resin alternately in multiple layers. Resin portion 1 may have a portion which differs in composition from remaining portions of resin portion 1. Resin portion 1 may be configured such that resin portion 1 on an anode surface side and resin portion 1 on a cathode surface side have different configurations, and each resin portion 1 at least partially contains fibers.

A plurality of modules 100 each having the above-mentioned configuration are prepared and are stacked onto each other, thus forming fuel cell module stacked body (hereinafter referred to as stacked body) 200 shown in FIG. 5. In the stacked body 200, MEAs 2 disposed adjacently to each other are electrically connected to each other in series or in parallel.

The number of MEAs 2 which are integrally joined in the form of a module is not limited to one. As shown in FIG. 6, module 101 may be formed by integrally joining a plurality of MEAs 2 with separator 3, separator 4 and separator 5 where a fuel gas passage and an oxidizing agent gas passage are formed on front and back surfaces of separator 5.

In such a case, the configuration of cooling water flow passage groove 15 with respect to MEA 2 is not particularly limited. For example, for one MEA 2, one cooling water flow passage groove 15 may be formed on contact surfaces between MEA2 and separator 3 and separator 4. Alternatively, as shown in FIG. 6, a plurality of MEAs 2 may be stacked onto each other using separators 5 and cooling water flow passage groove 15 may be formed for every plurality of MEAs 2.

The configuration of the fuel cell module is not particularly limited. For example, fuel cell module 100 may have a five-layered configuration where resin portion 1 is disposed between separator 3, MEA 2, and separator 4. In addition to the above, a fuel cell module may have a nine-layered configuration where resin portion 1 is disposed between separator 3, MEA 2, separator 5, MEA 2, and separator 4. Fuel cell module stacked bodies formed by stacking these fuel cell modules can be also considered.

When a stacked body is formed by stacking fuel cell modules, the fuel cell modules may be integrally joined to each other in such a manner that resin portion 1 is further disposed between the fuel cell modules.

Further, a sealing configuration of the surface of the module on which cooling water flow passage groove 15 is formed is not particularly limited. As shown in FIGS. 5 and 6, sealing members 20 such as gaskets and sealing grooves 21 on separator 4 or separator 5 may be additionally used. In stacked body 200 shown in FIG. 6, sealing members 20 are disposed between two modules 101. A material for forming sealing members 20 is not particularly limited. Sealing member 20 may be a sealing member having a linear shape, or may be formed using an adhesive agent. Sealing member 20 may be integrally formed with a separator.

As shown in FIG. 7, resin portion 1 may be disposed on a surface on which cooling water flow passage groove 15 is partially or wholly formed. That is, in module 102, resin portion 1 is disposed on a surface of module 102 on which cooling water flow passage groove 15 is formed. In stacked body 200 shown in FIG. 7, module 101 and module 102 are integrally joined to each other by adhesion with resin portion 1.

The thickness of resin portion 1 is not particularly limited, but it is preferable that resin portion 1 have the thickness substantially equal to the thickness of gas diffusion layer 13A, 13B of MEA 2. In such a manner, it is possible to reduce or eliminate a difference in thickness between a portion where a surface of separator 3, 4, 5 is brought into contact with gas diffusion layer 13 and a portion where the surface of separator 3, 4, 5 is brought into contact with resin portion 1. Accordingly, a leakage or a shortcut of a gas can be suppressed with a simpler configuration.

Resin portion 1 is in contact with at least a part of an end surface of gas diffusion layer 13 of MEA 2 in an outer periphery thereof. That is, the outer periphery of gas diffusion layer 13A, 13B may partially have regions where a resin is not present. On the other hand, the end surface of gas diffusion layer 13 may partially have a portion which is impregnated with a resin.

A material for forming separators 3, 4 is not particularly limited. Separators 3, 4 may be formed of a so-called carbon separator made of carbon particles and a resin bonding material. Alternatively, separators 3, 4 may be formed of other materials such as a prepreg which contains carbon fibers, a member obtained by processing a metal plate and the like, for example.

With the above-mentioned configuration, the gas tightness of the passage for a fuel gas and the gas tightness of the passage for an oxidizing agent gas are maintained with respect to the outside by resin portion 1 and hence, an external leakage and a cross leakage of a gas can be suppressed.

Further, since a resin is provided at least at a part of the end surface of gas diffusion layer 13 of MEA 2, a shortcut of a fuel gas and an oxidizing agent gas can be also suppressed. With the use of resin portion 1, a linear expansion coefficient of module 100 to 102 is lowered and hence, a change in size due to a change in temperature can be suppressed. Accordingly, an external leakage, a cross leakage and a shortcut of a fuel gas and an oxidizing agent gas can be stably suppressed with a thin and simple structure.

Further, resin portion 1 contains fibers, so that a linear expansion coefficient of module 100 to 102 is lowered to thereby suppress a change in size of the stacked body in a stacking direction and in an in-plane direction which is generated by a change in temperature inside of the stacked body at the time of starting or stopping the fuel cell. Accordingly, a stress generated on an interface between separator 3, 4, 5 and resin portion 1 is reduced and hence, the durability of module 100 to 102 can be increased. Particularly, by using a woven cloth as fibers, a linear expansion coefficient of module 100 to 102 can be further lowered and hence, it is preferable to use a woven cloth as fibers. That is, it is preferable that fibers form a woven cloth made of an insulating thermosetting resin.

Figure 8:
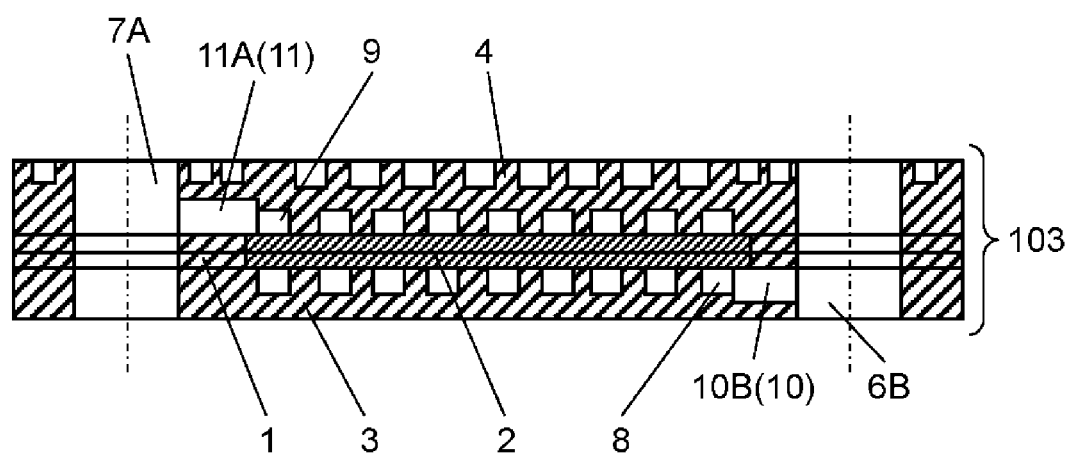
FIG. 8 is a cross-sectional view of another fuel cell module according to the exemplary embodiment of the present invention.
Figure 9:
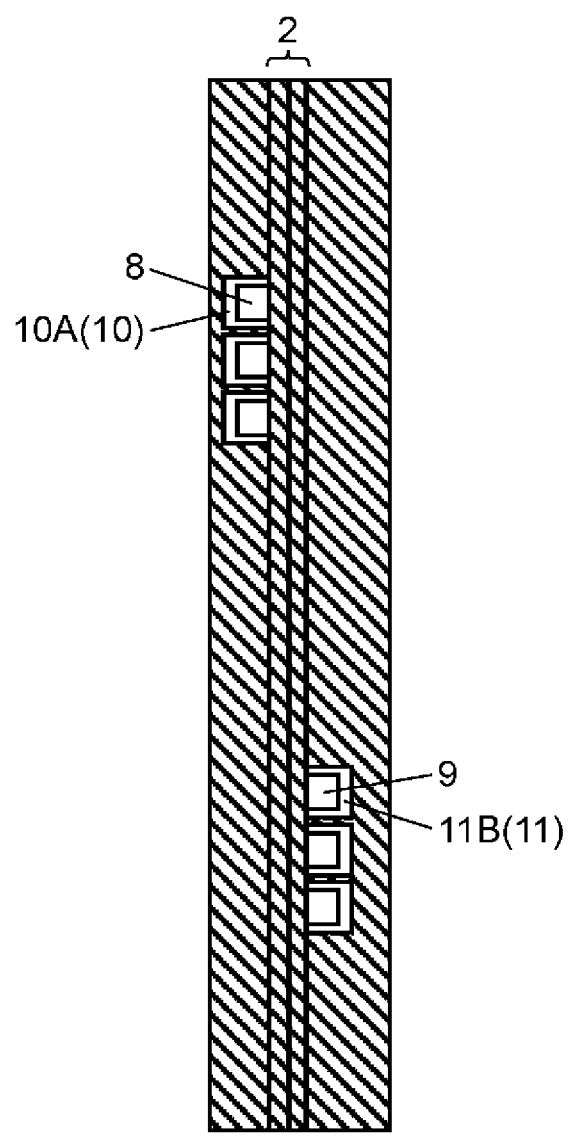
FIG. 9 is a view showing an example of another cross section of the fuel cell module shown in FIG. 8.

FIGS. 8 and 9 are cross-sectional views of another fuel cell module 103 according to the exemplary embodiment. FIG. 8 is a cross-sectional view corresponding to a cross section taken along a line IIIA-IIIA in FIG. 1, and FIG. 9 is a cross-sectional view corresponding to a cross section taken along a line IX-IX in FIG. 1.

In module 103, the cross-sectional area of connecting groove 10 differs from that of connecting groove 11. The cross-sectional area of connecting groove 10 is larger than a cross-sectional area of fuel gas flow passage groove 8, and the cross-sectional area of connecting groove 11 is larger than a cross-sectional area of oxidizing agent gas flow passage groove 9. Although only connecting grooves 10B, 11A are shown in FIG. 8, the same goes for connecting grooves 10A, 11B. Configurations of module 103 other than the above-mentioned configuration are substantially equal to corresponding configurations of module 100 shown in FIG. 3A.

Accordingly, at an introducing portion of the fuel gas connecting passage, at an introducing portion of the oxidizing agent gas connecting passage, at a discharging portion of the fuel gas connecting passage and at a discharging portion of the oxidizing agent gas connecting passage, the cross-sectional areas of the connecting grooves 10, 11 are respectively larger than cross-sectional areas of gas flow passages to which these connecting passages are respectively connected.

To be more specific, the cross-sectional area of connecting groove 10A is larger than the cross-sectional area of fuel gas flow passage groove 8 at a supply end, and the cross-sectional area of connecting groove 10B is larger than the cross-sectional area of fuel gas flow passage groove 8 at a discharge end. The cross-sectional area of connecting groove 11A is larger than the cross-sectional area of oxidizing agent gas flow passage groove 9 at a supply end, and the cross-sectional area of connecting groove 11B is larger than the cross-sectional area of oxidizing agent gas flow passage groove 9 at a discharge end. Although not particularly shown in the drawings, the shape of the flow passage or the number of flow passages on the electrode surface may be changed. In this case, similarly to the above case, it is sufficient that a cross-sectional area of the connecting groove at a supply end and a cross-sectional area of the connecting groove at a discharge end may be larger than cross-sectional areas of the flow passage grooves to which the connecting grooves are connected.

Figure 10:
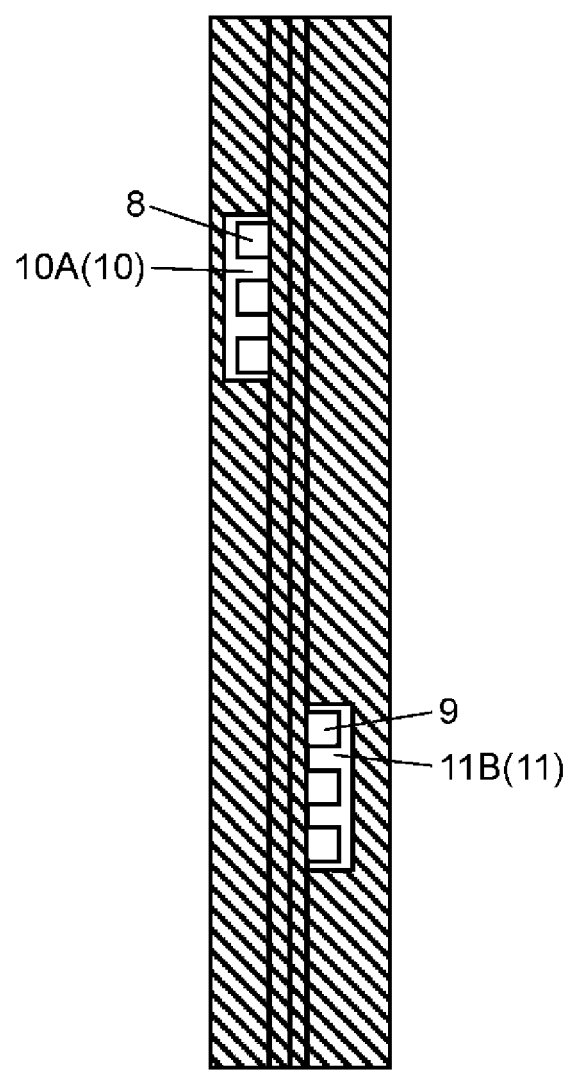
FIG. 10 is a view showing another example of another cross section of the fuel cell module shown in FIG. 8.

FIG. 9 shows a configuration where the width and the depth of connecting groove 10A are larger than the width and the depth of fuel gas flow passage groove 8 at a supply end, for example. However, the configuration for making the cross-sectional area of connecting groove 10A larger is not limited to the above-mentioned configuration. For example, as shown in FIG. 10, the number of flow passages connected to connecting groove 10A may be changed. That is, fuel gas flow passage groove 8 and connecting groove 10A have one to one relationship in FIG. 9, but one connecting groove 10A is provided for a plurality of fuel gas flow passage grooves 8 in FIG. 10.

Figure 11:
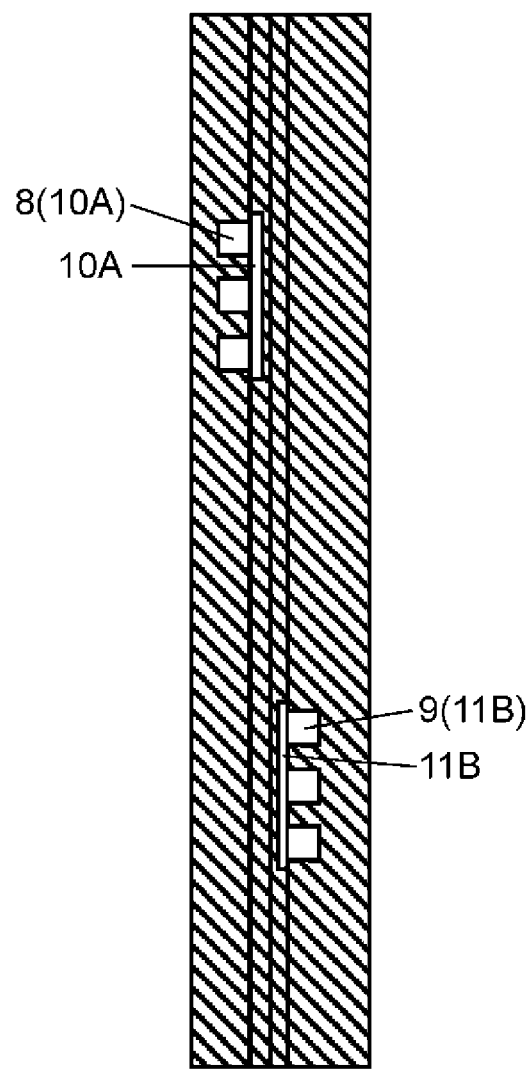
FIG. 11 is a view showing still another example of another cross section of the fuel cell module shown in FIG. 8.

Alternatively, as shown in FIG. 11, the cross-sectional area of connecting groove 10A may be increased by reducing the thickness of resin portion 1 at a portion which corresponds to connecting groove 10A or by not forming resin portion 1.

Note that, such configurations of connecting grooves 10, 11 may be applied to stacked body 200 which has been described with reference to FIGS. 6 and 7.

As described above, by increasing the cross-sectional areas of connecting grooves 10, 11, the following advantageous effects can be further obtained in addition to the advantageous effect obtained by module 100 shown in FIG. 3A. That is, in preparing module 103, separators 3, 4 and MEA 2 are integrally bonded to each other by applying a heating and pressurizing operation to resin sheets described later. Accordingly, it is possible to prevent a connecting groove from being partially or wholly closed due to the flow of a resin at this time. As a result, the performance of module 103 can be stabilized.

Figure 12:
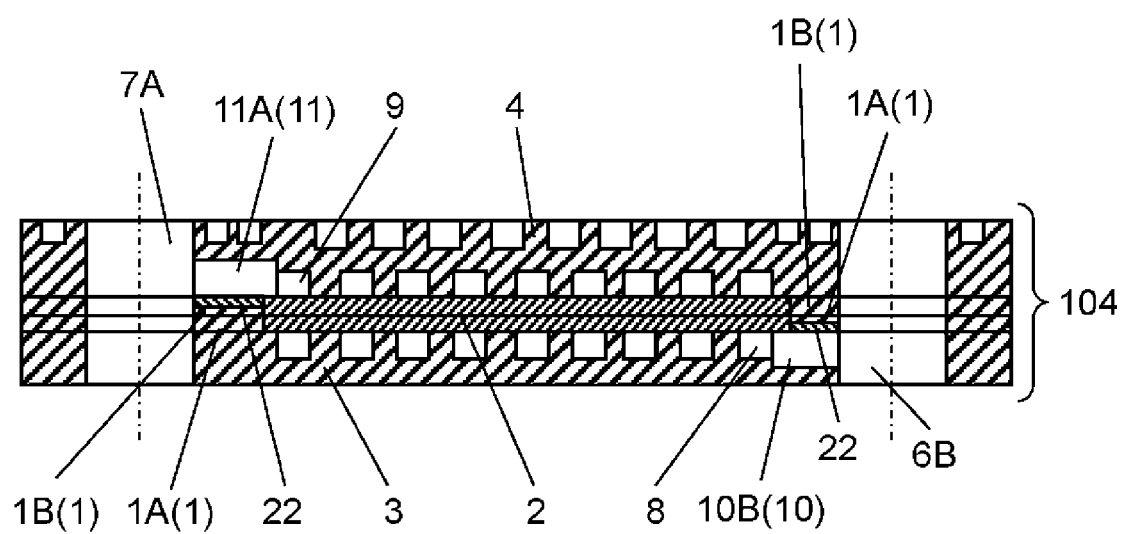
FIG. 12 is a cross-sectional view of still another fuel cell module according to the exemplary embodiment of the present invention.
Figure 13:
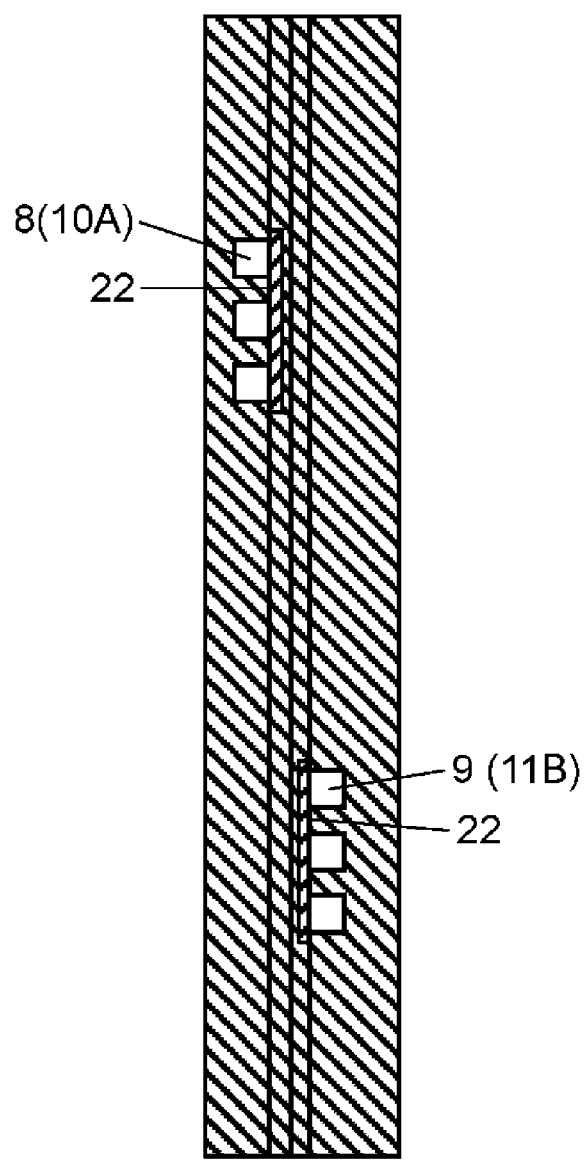
FIG. 13 is a view showing an example of another cross section of the fuel cell module shown in FIG. 12.

FIGS. 12 and 13 are views schematically showing a structure of still another fuel cell module 104 of the exemplary embodiment. FIG. 12 is a cross-sectional view corresponding to a cross section taken along a line IIIA-IIIA in FIG. 1, and FIG. 13 is a cross-sectional view corresponding to a cross section taken along a line IX-IX in FIG. 1.

Module 104 includes resin sheets 22 in addition to resin portion 1. Resin sheets 22 are disposed on a surface of resin portion 1 (1A) which faces connecting grooves 10 and on a surface of resin portion 1 (1B) which faces connecting grooves 11 in module 103. That is, the portions of resin portion 1 which face connecting grooves 10, 11 respectively have a two or more layered structure. Thus, resin portion 1 and resin sheet 22 can be collectively regarded as a resin portion which at least partially contains fibers. In other words, at portions of the resin portion which are exposed to connecting grooves 10, 11, a plurality of different kinds of resins are stacked onto each other. Configurations of module 104 other than the above-mentioned configuration are substantially equal to corresponding configurations of module 103 shown in FIG. 8.

The kind of resin sheet 22 is not particularly limited, but a resin sheet having superior heat resistance property is preferably used. Accordingly, a PPS or a polyimide film may be used as resin sheet 22. The thickness of resin sheet 22 is not also particularly limited, but the thickness of resin sheet 22 is preferably set to one third or less of the thickness of resin portion 1. In this case, resin sheet 22 can be easily embedded in resin portion 1 and thus a stepped portion in a thickness direction is not generated in resin portion 1, so that the shapes of separators 3, 4 which are brought into contact with resin sheet 22 can be simplified.

Such a configuration which includes resin sheets 22 may be applied to stacked body 200 described with reference to FIGS. 6 and 7.

With such a configuration, in addition to the advantageous effects obtained by module 103 shown in FIG. 8, the following advantageous effects can be also obtained. That is, in preparing module 104, separators 3, 4 and MEA 2 are integrally joined to each other by performing a heating and pressurizing operation to resin sheets described later. In such a case, it is possible to prevent resin sheet 22 from partially or wholly closing a connecting groove due to the flow of a resin. As a result, the performance of module 104 can be stabilized.

Figure 14:
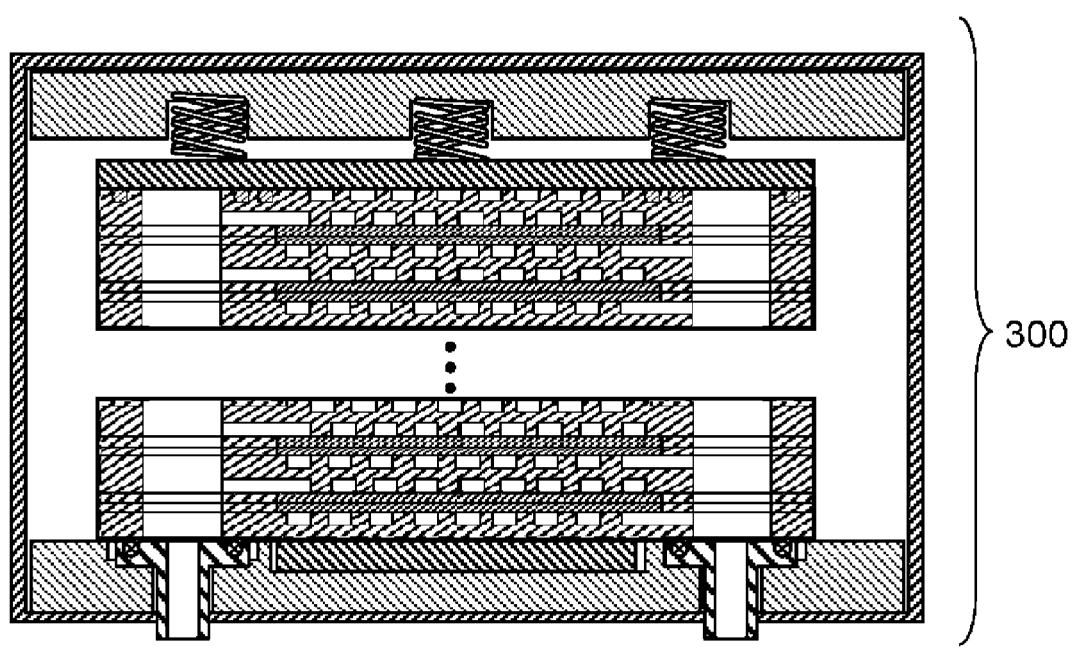
FIG. 14 is a schematic cross-sectional view of a fuel cell stack according to the exemplary embodiment of the present invention.
Figure 15:
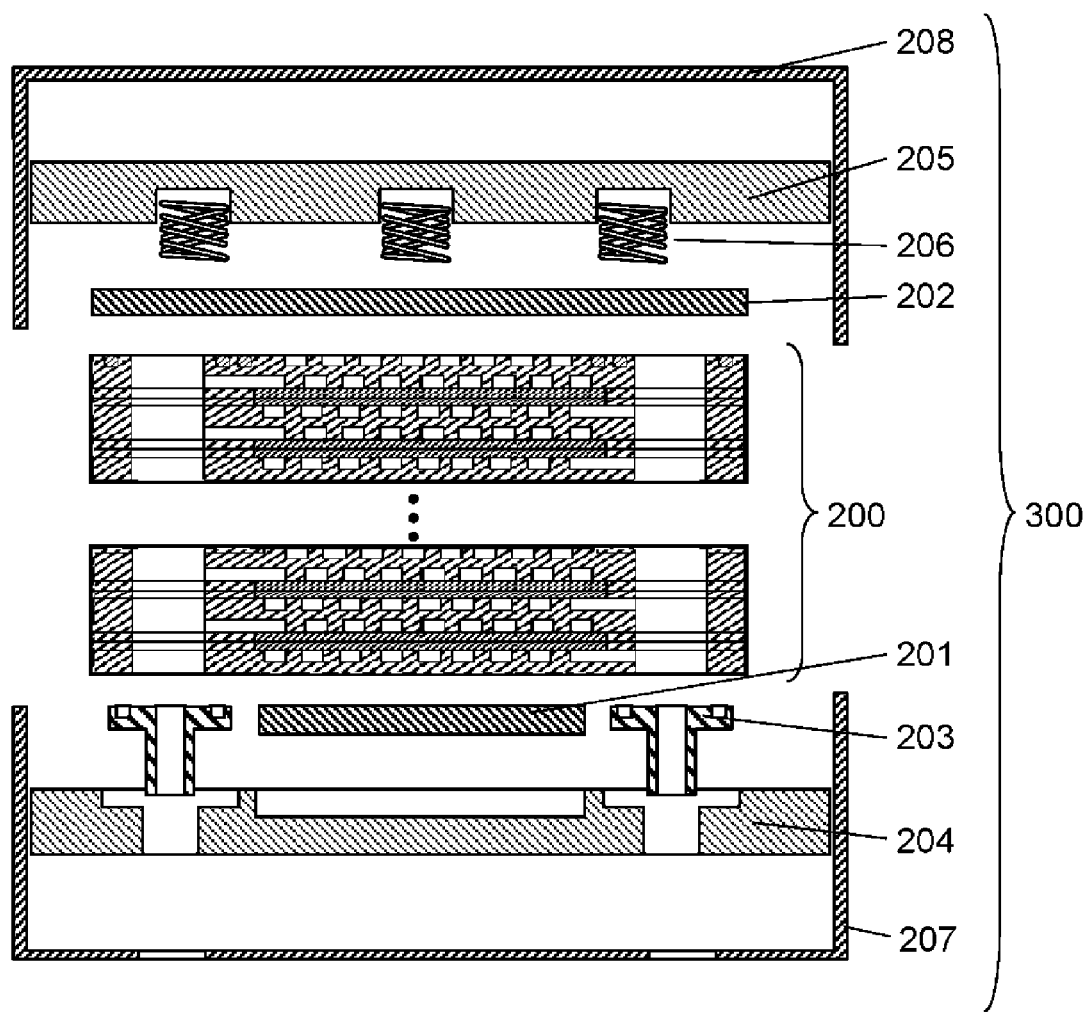
FIG. 15 is an exploded view of the fuel cell stack shown in FIG. 14.

FIG. 14 is a cross-sectional view schematically showing a structure of fuel cell stack 300 according to the exemplary embodiment of the present invention, and FIG. 15 is an exploded view of fuel cell stack 300 shown in FIG. 14.

As shown in FIG. 15, current collecting portions 201, 202 for taking out electricity are disposed on both sides of stacked body 200 such that current collecting portions 201, 202 are brought into contact with stacked body 200. Manifolds 203 for supplying and discharging a fuel gas, an oxidizing agent gas and cooling water from and to the outside are disposed on stacked body 200 such that manifolds 203 are brought into gas-tight contact with manifold portions of stacked body 200. Insulating portions 204, 205, fastening portions 207, 208 for holding a load, and elastic bodies 206 are disposed outside the stacked body 200. Fastening portion 207 and fastening portion 208 are fixed to each other in a state where these constitutional parts are pressurized with elastic bodies 206 interposed therebetween, thus forming fuel cell stack 300.

Although a configuration for fixing fastening portions 207, 208 to each other is not shown in the drawings, fastening portions 207, 208 may be fixed to each other by bolt fastening, caulking, fixing using pins, welding or the like, and a means for fixing fastening portions 207, 208 to each other is not particularly limited. In stacked body 200, at least one fuel cell module which is formed by integrally joining at least one MEA 2 and separators to each other by resin portions 1 is stacked. Gas tightness between respective modules is maintained by a sealing member disposed between the modules.

In this exemplary embodiment, cooling water passages are formed on an end portion of each module. However, the cooling water passages are not necessarily formed on a surface of the module dedicated to the cooling water passages. The cooling water passages may be formed on a surface of the module on which fuel gas passages or oxidizing agent gas passages are formed, or on a plain surface of the module on which passages are not formed.

Configurations of current collecting portions 201, 202, manifolds 203, insulating portions 204, 205, fastening portions 207, 208, and elastic bodies 206 are not particularly limited to the configurations shown in FIGS. 14 and 15. It is sufficient that the fuel cell stack 300 has a structure where a plurality of stacked fuel cell modules are brought into contact with each other, and electricity can be taken out.

With such a configuration, an external leakage, a cross leakage and a shortcut of a fuel gas and an oxidizing agent gas can be suppressed and, at the same time, modules can be connected to each other in series by simply stacking the modules. Accordingly, the performance of fuel cell stack 300 can be stabilized.

Figure 16:
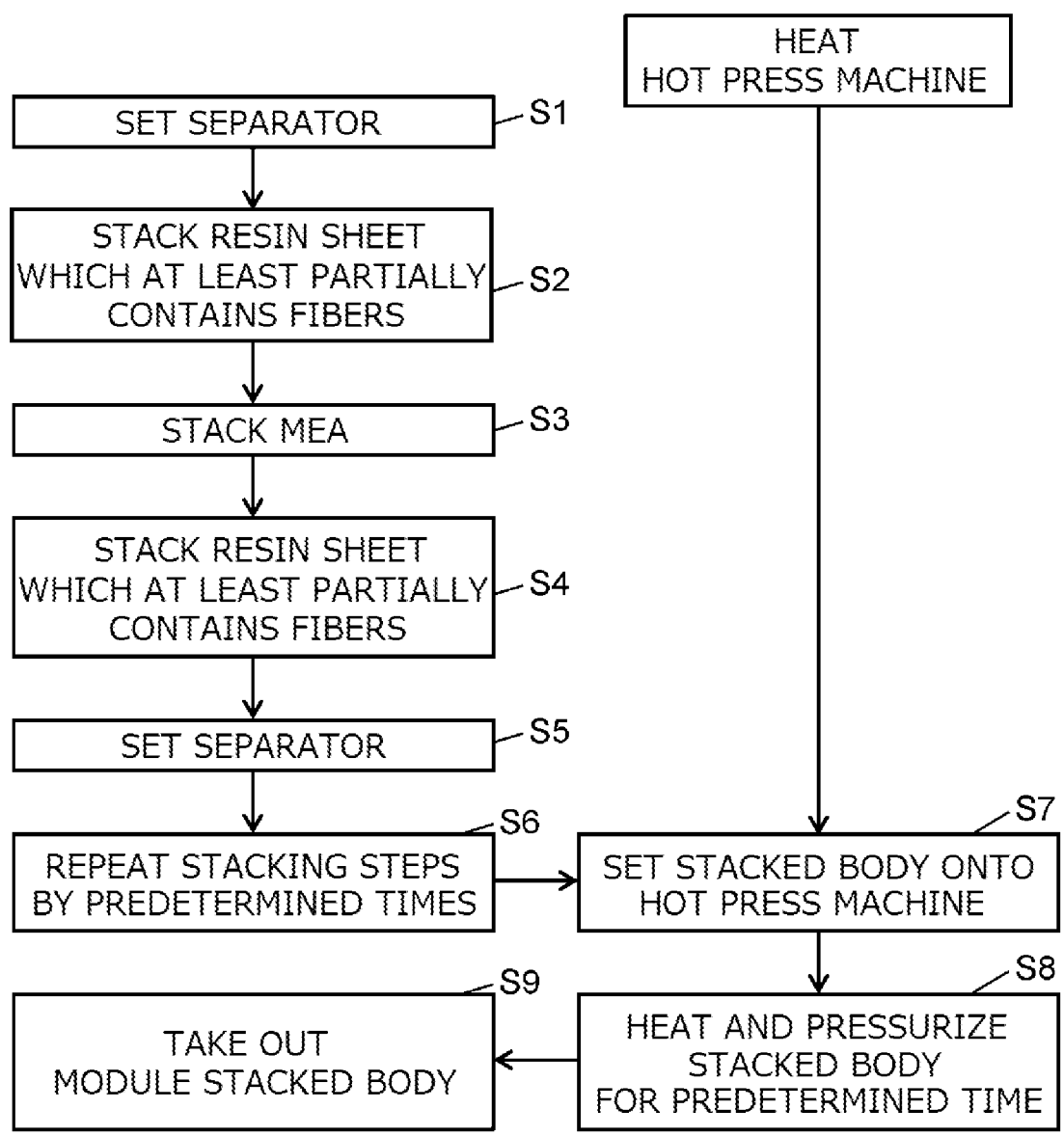
FIG. 16 is a flowchart for producing a fuel cell module according to the exemplary embodiment of the present invention.

FIG. 16 is a flowchart showing a method for producing a fuel cell module stacked body according to the exemplary embodiment. FIGS. 17 to 19 and FIG. 21 are plan views of resin sheets for forming resin portion 1. Hereinafter, with reference to FIG. 16, steps of assembling stacked body 200 formed of modules 100 are mainly described.

Figure 17:
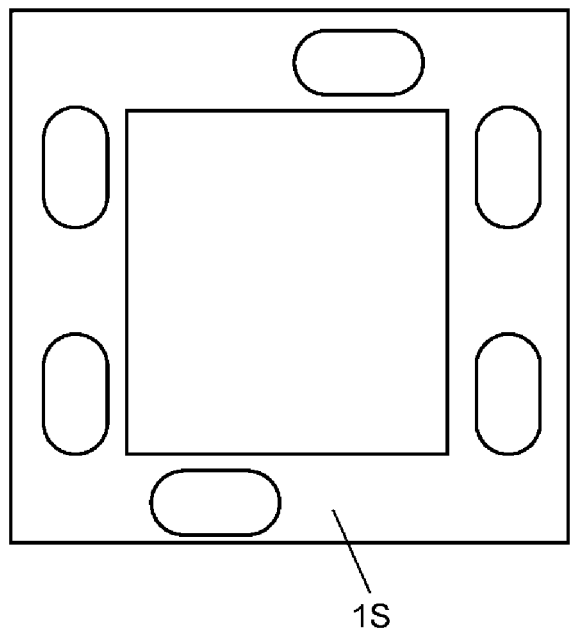
FIG. 17 is a plan view showing one example of a resin sheet which forms a resin portion of the fuel cell module according to the exemplary embodiment of the present invention.

First, separator 3 is set to a die (S1). Next, resin sheet 1S shown in FIG. 17 is made to overlap with separator 3, for example (S2). Then, MEA 2 is made to overlap with resin sheet 1S such that an electrode portion is disposed in a center space portion of resin sheet 1S (S3). Then, another resin sheet 1S is made to overlap with MEA 2 such that the electrode portion of MEA 2 is disposed in a center space portion of another resin sheet 1S (S4). Subsequently, separator 4 is made to overlap with another resin sheet 1S (S5). The above-mentioned operations S1 to S5 are repeated by predetermined times (S6). A stacked body formed as described above is set in a hot press machine which is heated in advance (S7). Then, a heating and pressurizing operation is applied to the stacked body for a predetermined time (S8). After a lapse of the predetermined time, stacked body 200 is taken out from the hot press machine (S9) and stacked body 200 is cooled, so that stacked body 200 formed of modules 100 is completed.

In separators 3, 4 and resin sheet 1S, through holes which correspond to fuel gas manifolds 6, oxidizing agent gas manifolds 7 and cooling water manifolds 14 are formed. In making separators 3, 4 and resin sheet 1S overlap with each other, the positions of the corresponding through holes are made to agree with each other.

In step S3, gas diffusion layers 13 are joined by adhesion in advance to polymer electrolyte membrane 12 which forms the electrode portion. Besides such a configuration, in step S3, polymer electrolyte membrane 12 which forms the electrode portion and gas diffusion layers 13 may be stacked onto each other and then, a heating and pressurizing operation may be performed. In this case, by performing the heating and pressurizing operation, polymer electrolyte membrane 12 and gas diffusion layers 13 are adhered to each other simultaneously and hence, steps of producing a fuel cell module can be simplified. By adopting such a method, it is possible to produce a thin fuel cell module while suppressing an external leakage, a cross leakage and a shortcut of a fuel gas and an oxidizing agent gas.

Figure 18:
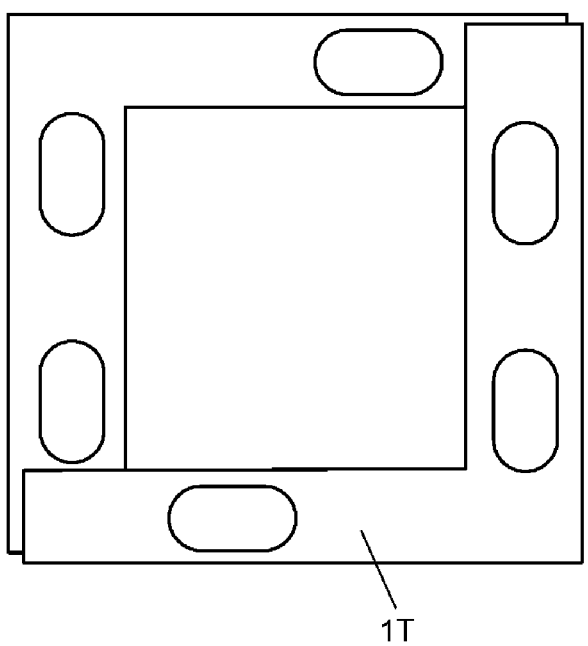
FIG. 18 is a plan view showing another example of the resin sheet which forms the resin portion of the fuel cell module according to the exemplary embodiment of the present invention.
Figure 19:
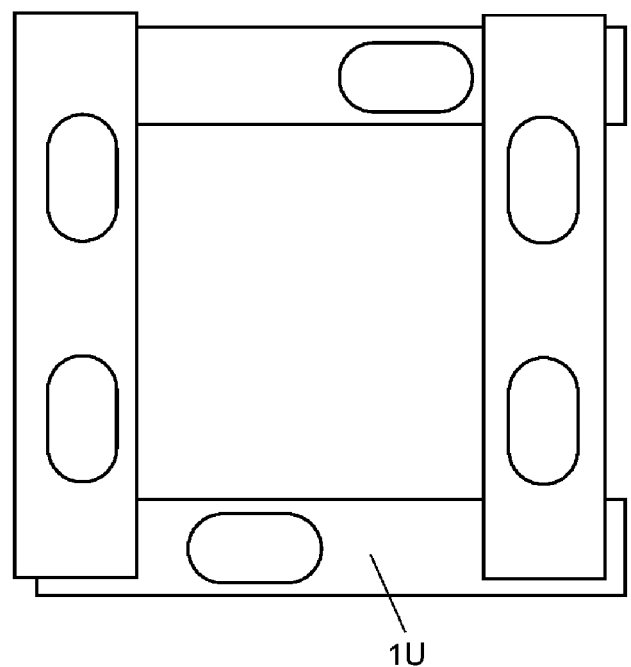
FIG. 19 is a plan view showing still another example of the resin sheet which forms the resin portion of the fuel cell module according to the exemplary embodiment of the present invention.

As described above, resin sheet 1S shown in FIG. 17 is formed into an annular shape, and through holes which correspond to manifolds and a center space for storing an electrode portion of MEA 2 are formed in resin sheet 1S by blanking. Besides the above-mentioned configuration, for example, two resin sheets 1T each having an L shape may be combined with each other as shown in FIG. 18, or four resin sheets 1U each having a rectangular shape may be combined with each other as shown in FIG. 19. In such a case, resin sheets 1T or resin sheets 1U are made to partially overlap with each other. Alternatively, a resin sheet (not shown) which is formed into an angular C shape by blanking and resin sheet 1U may be combined with each other. By adopting such a configuration, it is possible to reduce an amount of material loss caused by forming the resin sheet into a shape by blanking.

Although conditions for performing the heating and pressurizing operation are not particularly limited, to prevent the generation of excessive mechanical and thermal stresses in MEA 2, it is preferable to perform the heating and pressurizing operation under conditions where the pressure is set to 2 MPa or less and a temperature is set to 170° C. or below. When prepreg FR-4 where glass fibers are impregnated with an epoxy resin is used as resin sheet 1S, resin sheet 1S is adhered to other members under conditions that the stress is set to 0.3 to 0.6 MPa, a temperature is set to 120 to 160° C. and the adhesion time is set to 120 to 3600 seconds. In performing the pressing operation, as a control method, either a pressing force control or a size control may be adopted. Fibers are contained in resin portion 1 and hence, a flow of a resin and a change in size of resin portion 1 can be suppressed. Further, fibers are present in resin portion 1 and hence, separators 3, 4 can be insulated from each other with certainty. It is desirable that the stacked body be pressed while performing a size control using spacers or the like.

Resin sheets 1S which form resin portion 1 are preferably made of a prepreg where glass fibers are impregnated with an epoxy resin from a viewpoint of a heat-resistant temperature, a linear expansion coefficient and the like, and various physical properties may be selected besides FR-4. However, fibers and a resin of resin sheets 1S are not limited to the above-mentioned fibers and resin. For example, other fibers such as aramid fibers or carbon fibers may be used as fibers of resin sheets 1S according to desired strength, thickness, linear expansion coefficient and contained material. The resin of resin sheets 1S may be selected from other thermosetting resins such as a phenol resin, an unsaturated polyester resin or a polyurethane resin, or may be selected from thermoplastic resins.

Alternatively, a resin sheet on an anode surface side and a resin sheet on a cathode surface side may have different configurations, and the respective resin sheets may at least partially contain fibers.

Figure 20:
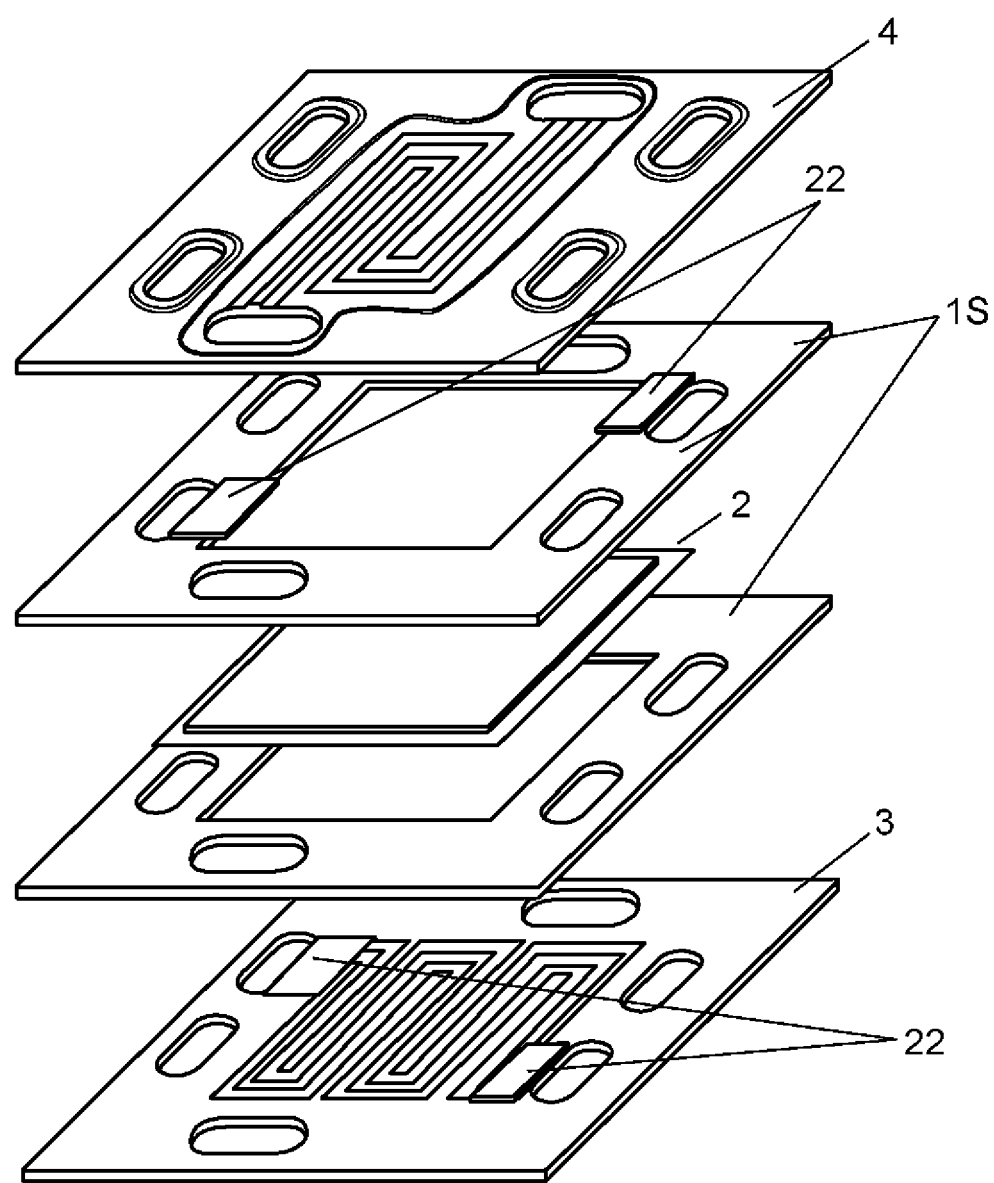
FIG. 20 is an exploded perspective view showing still another example of the resin portion of the fuel cell module according to the exemplary embodiment of the present invention.
Figure 21:
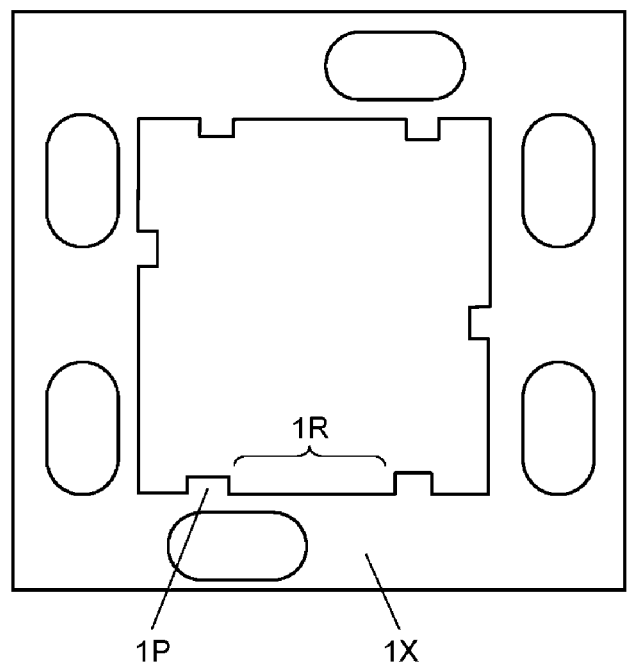
FIG. 21 is a plan view showing still another example of the resin sheet which forms the resin portion of the fuel cell module according to the exemplary embodiment of the present invention.

A resin sheet which contains fibers and another resin may be stacked onto each other in multiple layers. That is, as shown in FIGS. 12 and 13, resin portion 1 and resin sheet 22 may be used in combination. In this case, as shown in FIG. 20, resin sheets 22 are disposed on surfaces of separators 3, 4 which are brought into contact with connecting grooves 10, 11 respectively. Then, separator 3, resin sheet 1S, MEA 2, resin sheet 1S and separator 4 are stacked onto each other in this order, and the heating and pressurizing operation is applied to this stacked body. It is preferable to produce a module as described above.

By adopting such a producing method, with use of resin sheet 22, it is possible to prevent a possibility that a resin, which flows at the time of applying heating and pressurizing operation, flows into connecting grooves 10, 11 and closes connecting grooves 10, 11.

Resin portion 1 may partially have a different composition. Particularly, resin portion 1 may preferably configured such that the fluidity of a resin of resin portion 1 is lowered at portions which correspond to connecting grooves 10, 11 of separator 3, 4. Although not shown in the drawings, it is preferable that portions of resin portion 1 which are brought into contact with connecting grooves 10, 11 be cured by a means such as heating in advance before resin portions 1, MEA 2, separator 3 and separator 4 are stacked onto each other. By adopting such a producing method, the fluidity of a resin which is brought into contact with connecting grooves 10, 11 can be lowered at the time of curing resin portion 1 by heating, and accordingly, it is possible to prevent the resin from closing connecting grooves 10, 11.

According to the producing method of the exemplary embodiment, the shape of a flow passage and the fluidity of a resin can be changed between portions of resin portion 1 which correspond to connecting grooves 10, 11 and other portions of resin portion 1. Also in such a case, at the outer peripheral portion around the electrode portion where both separators 3, 4 which sandwich MEA 2 and resin portions 1 have a flat plate shape, sealing can be reliably performed by making a resin flow into and impregnate into the outer peripheral portion with certainty. On the other hand, in connecting grooves 10, 11 formed on separators 3, 4, a flow of resin is suppressed, so that it is possible to prevent the resin from closing flow passages.

As described in Unexamined Japanese Patent Publication No. 2005-166425, in a method where an adhesive agent is applied to the separators by coating, it is difficult to partially change fluidity of a resin. Meanwhile, according to the producing method of the exemplary embodiment, particularly, fluidity of a resin can be partially changed. Further, with use of a resin sheet which contains fibers in advance, even when curing of the resin sheet locally progresses, the shape of the resin sheet can be maintained.

In resin sheet 1S shown in FIG. 17, a space portion for storing an electrode portion of MEA 2 is formed into a rectangular shape by blanking. However, the shape of the space portion formed by blanking is not limited to a rectangular shape. As in the case of resin sheet 1X shown in FIG. 21, it is preferable to form the space portion into a shape having projecting portions 1P which project toward the electrode portion.

Figure 22:
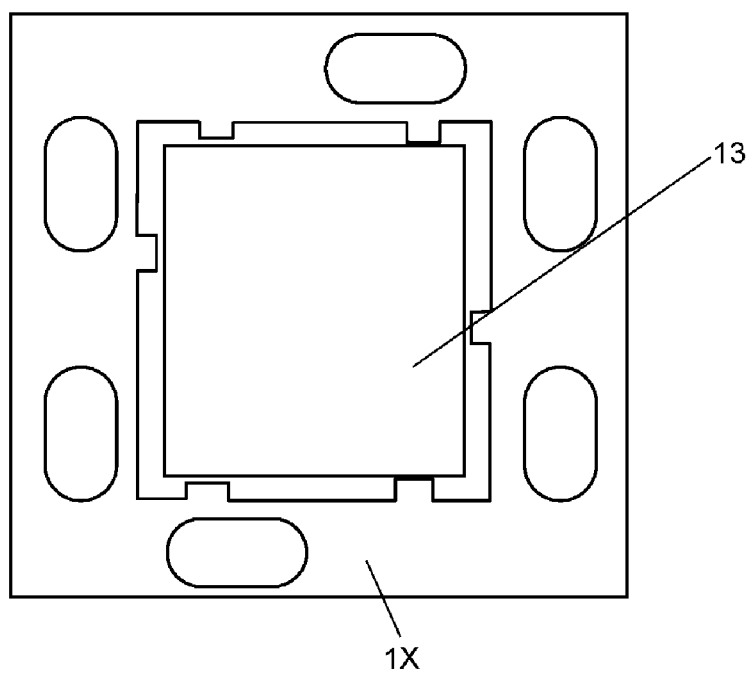
FIG. 22 is a plan view showing an assembly example which uses the resin sheet shown in FIG. 21.

As shown in FIG. 22, projecting portions 1P perform positioning of MEA 2 and resin sheets 1X at the time of stacking MEA 2 and resin sheets 1X, so that the production of a fuel cell module is facilitated. Further, gas diffusion layer 13 of MEA 2 and resin portion 1 can be brought into contact with each other with certainty after a heating and pressurizing operation is performed. In addition, a shortcut of a fuel gas and an oxidizing agent gas can be reliably prevented. Each recessed portion 1R disposed between two projecting portions 1P forms a space between resin sheet 1X and gas diffusion layer 13 of MEA 2 and hence, it is possible to prevent a resin which flows at the time of performing the heating and pressurizing operation from flowing into a flow passage which faces the electrode portion.

Figure 23A:
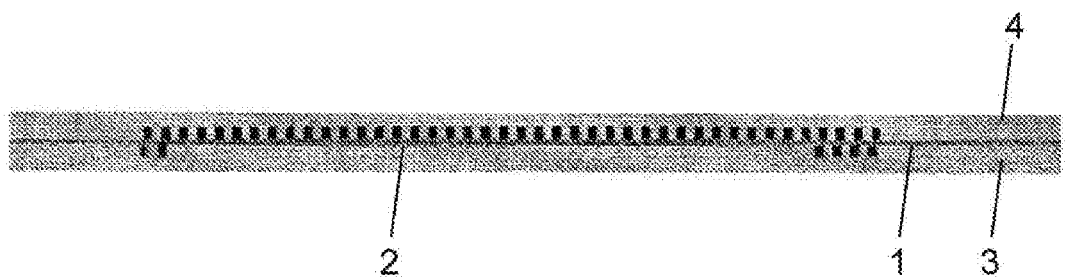
FIG. 23A is a view showing an electron microscope photograph of a cross section of the fuel cell module according to the exemplary embodiment of the present invention.
Figure 23B:
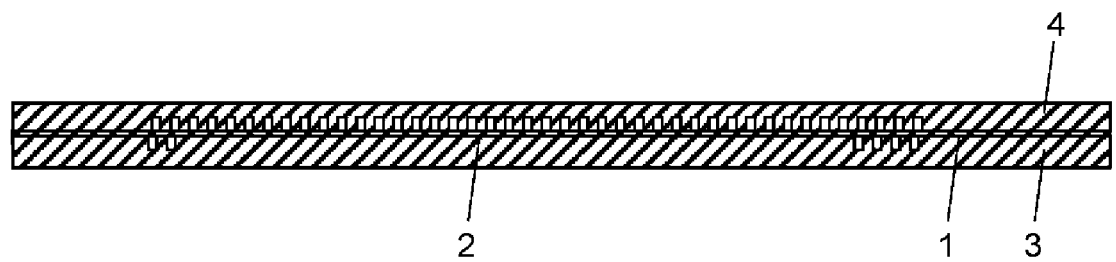
FIG. 23B is a schematic view of the electron microscope photograph shown in FIG. 23A.

FIG. 23A shows an electron microscope photograph of a cross section of fuel cell module 100 which is actually produced, and FIG. 23B is a schematic view of the electron microscope photograph shown in FIG. 23A. It can be understood that separators 3, 4 and MEA 2 are gas-tightly and integrally joined to each other by resin portion 1 in a pressure contact state.

According to a fuel cell module of the present invention, a thin fuel cell module can be provided while suppressing an external leakage, a cross leakage and a shortcut of a fuel gas and an oxidizing agent gas. Hence, the fuel cell module of the present invention is applicable to various fuel cells including a polymer electrolyte fuel cell.

The invention claimed is:

1. A fuel cell module comprising:
an electrode membrane assembly which includes:
an electrode portion including a polymer electrolyte membrane, an anode electrode formed on a first surface of the polymer electrolyte membrane, and a cathode electrode formed on a second surface of the polymer electrolyte membrane; and
a pair of gas diffusion layers, one of which is in contact with an anode surface of the electrode portion at which the anode electrode is disposed and another of which is in contact with a cathode surface of the electrode portion at which the cathode electrode is disposed;
a pair of separators which sandwiches the electrode membrane assembly from respective the anode surface and the cathode surface, each of the pair of separators includes: a flow passage groove configured to supply and discharge one of a fuel gas and an oxidizing agent gas to and from the electrode portion; a pair of connecting grooves which are connected to a supply end and a discharge end of the flow passage groove; and a pair of manifolds which are connected to the flow passage groove through the pair of connecting grooves, and
a resin portion which is made of a resin containing at least partially fibers, wherein the electrode membrane assembly and the pair of separators are adhered to each other by the resin portion,
wherein a portion where fluidity of a resin sheet is lower than portions of the resin portion is formed at a surface opposite to a face where the electrode membrane assembly is adhered to the resin portion, and corresponding to the pair of connecting grooves.

2. The fuel cell module according to claim 1, wherein a cross-sectional area of each of the pair of connecting grooves at a plane perpendicular to a flowing direction of one of the fuel gas and the oxidizing agent gas is larger than a cross-sectional area of the flow passage groove at a plane perpendicular to a flowing direction of the one of the fuel gas and the oxidizing agent gas.

3. A fuel cell module comprising:
an electrode membrane assembly which includes:
an electrode portion including a polymer electrolyte membrane, an anode electrode formed on a first surface of the polymer electrolyte membrane, and a cathode electrode formed on a second surface of the polymer electrolyte membrane; and
a pair of gas diffusion layers, one of which is in contact with an anode surface of the electrode portion at which the anode electrode is disposed, and another of which is in contact with a cathode surface of the electrode portion at which the cathode electrode is disposed;

a pair of separators which sandwiches the electrode membrane assembly from respective the anode surface and the cathode surface, and each of the pair of separators includes:
- a flow passage groove configured to supply and discharge one of a fuel gas and an oxidizing agent gas to and from the electrode portion;
- a pair of connecting grooves which are connected to a supply end and a discharge end of the flow passage groove; and
- a pair of manifolds which are connected to the flow passage groove through the pair of connecting grooves, and
a resin portion which is made of a resin containing at least partially fibers,
wherein the electrode membrane assembly and the pair of separators are adhered to each other by the resin portion,
wherein at least a part of an end portion in each of the pair of gas diffusion layers is impregnated with the resin, and a plurality of resins which are different kind with each other are stacked, at a surface opposite to a face where the electrode membrane assembly is adhered to the resin portion, in a part of the resin portion exposed to the pair of connecting grooves.

4. A fuel cell module comprising:
an electrode membrane assembly which includes:
- an electrode portion including a polymer electrolyte membrane, an anode electrode formed on a first surface of the polymer electrolyte membrane, and a cathode electrode formed on a second surface of the polymer electrolyte membrane; and
- a pair of gas diffusion layers, one of which is in contact with an anode surface of the electrode portion at which the anode electrode is disposed, and another of which is in contact with a cathode surface of the electrode portion at which the cathode electrode is disposed;
a pair of separators which sandwiches the electrode membrane assembly from respective the anode surface and the cathode surface, and each of the pair of separators includes:
- a flow passage groove configured to supply and discharge one of a fuel gas and an oxidizing agent gas to and from the electrode portion;
- a pair of connecting grooves which are connected to a supply end and a discharge end of the flow passage groove; and
- a pair of manifolds which are connected to the flow passage groove through the pair of connecting grooves;
a resin portion which is made of a resin containing at least partially fibers, the electrode membrane assembly and the pair of separators are adhered to each other by the resin portion; and
a resin sheet disposed at a portion of a surface, which is opposite to a face where the electrode membrane assembly is adhered to the resin portion, and corresponds to the pair of connecting grooves, of the resin portion and having a different kind of resin from the resin portion.

* * * * *